(12) United States Patent
Ono et al.

(10) Patent No.: US 6,337,727 B1
(45) Date of Patent: Jan. 8, 2002

(54) LIQUID CRYSTAL DISPLAY DEVICE AND METHOD OF FABRICATING THEREOF

(75) Inventors: Koichi Ono; Koji Terumoto, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/392,631

(22) Filed: Sep. 9, 1999

(30) Foreign Application Priority Data

Sep. 10, 1998 (JP) .......................................... 10-257169

(51) Int. Cl.[7] ...................... G02F 1/1333; G02F 1/1339
(52) U.S. Cl. ........................................ 349/153; 349/110
(58) Field of Search ............................. 349/110, 58, 59, 349/60, 153

(56) References Cited

U.S. PATENT DOCUMENTS 5,169,693 A * 12/1992 Fujimura ........................ 428/1
5,455,696 A * 10/1995 Saito et al. .................. 349/153

FOREIGN PATENT DOCUMENTS

JP            6-186539   *  7/1994   .................. 349/153

* cited by examiner

*Primary Examiner*—Toan Ton
(74) *Attorney, Agent, or Firm*—Morgan, Lewis & Bockius LLP

(57) ABSTRACT

To provide a liquid crystal display device which can remove leakage of light from a sealant portion in a negative-type display to improve the appearance of an image. Where a large-scale display is composed of a large number of liquid crystal display devices, to provide the liquid crystal display device which can surely make light-proof to the joints to constitute such a large-scale display with an excellent display characteristic. Electrode patterns 3 and 4 are formed on inner surfaces of two insulating base plates 1 and 2. These two insulating base plates 1 and 2 sandwiches a liquid crystal layer to constitute a liquid crystal panel 15. A light-shielding mask 11 is provided at the end of the liquid crystal panel 15 from which no electrode pattern is introduced so that it sandwiches the insulating plates 1 and 2 from both sides of the liquid crystal panel 15.

16 Claims, 6 Drawing Sheets

LIQUID CRYSTAL DISPLAY DEVICE AND METHOD OF FABRICATING THEREOF

BACKGROUND OF THE INVENTION

1. Field of the Invention

The present invention relates to a liquid crystal display device with excellent visibility, which prevents light from leaking out from the periphery of a liquid crystal panel in its negative type display. More particularly, the present invention relates to a liquid crystal display device which prevents light leaking out from each of liquid crystal panels e.g. where a large number of the liquid crystal panels are arranged to constitute a large-scale display, thereby increasing the visibility.

2. Description of the Related Art

A liquid crystal display device is structured so that a liquid crystal layer is sandwiched by two insulating plates and polarization plates are arranged on the outer surfaces of the two insulating plates, respectively. In the liquid crystal display device, a voltage can be applied to the liquid crystal layer through electrode patterns provided on the inner surfaces of the insulating plates so that the display can be made by controlling the voltage to be applied. More specifically, when the voltage is not applied to the liquid crystal layer, using the optical rotation property of the liquid crystal layer, linear polarized light having only a fixed vibrating direction is optically-rotated by the one polarizing plate by a certain angle. In this case, if the direction of the rotated linear polarized light coincides with that of the polarizing axis of the other polarizing plate, light passes through the liquid crystal layer, whereas if not, the light does not pass therethrough. On the other hand, when the voltage is applied to the liquid crystal layer, the linear polarized light is not optically rotated. In this way, whether or not the light passes can be controlled whether or not the voltage is applied. Thus, by controlling the voltage for each pixel, desired display can be realized. "Negative-type display" refers to the case where both polarizing plates are arranged so that light does not pass when the voltage is not applied to the liquid crystal layer. "Positive-type display" refers to the case where the light passes when the voltage is not applied so that only the pixel to which a voltage is applied is displayed in black.

In the negative type display, in the state where the liquid crystal panel is not operated, the entire face of the liquid crystal panel exhibits a black image. However, as shown in FIG. 11, in the area of a liquid crystal panel 20 to which sealant 27 is bonded and its outer periphery, liquid crystal is not located. Therefore, epoxy resin which is a sealant and a spacer which is mixed to make the gap uniform transmit light so that the light is not entirely optically rotated even with the provision of the polarizing plates on both sides. Thus, as shown in FIG. 11, although the inside of the sealant 27 where the liquid crystal layer is located exhibits a black image (shaded "B" area), light leaks from the periphery. This makes the image very poor. Particularly, in the liquid crystal panel for color display, which is generally in a negative-type display, such a tendency is remarkable.

In a larger-scale display composed of a number of liquid crystal panels, light leaks from the joints therebetween. This makes the image poor in continuous display. In order to overcome such an inconvenience, as shown in FIG. 12, a light shielding tape 28 such as a black vinyl tape is bonded to each joint. The problem relative to the joints occurs not only in the negative display but also in the positive display. Namely, the sealant portion which is black becomes white if no polarized plate is located on the outside thereof.

However, where the light shielding tape 28 is bonded to the joint, discrepancy in position is apt to occur. Therefore, on the display portion onto which the tape is bonded, some breaks may be generated. Otherwise, on the peripheral portion, the leakage of light cannot be prevented completely. In addition, after the liquid crystal panels 20 have been arranged, it is difficult to bond the light shielding tape onto the joints. Further, where a single liquid crystal panel is replaced by another one afterwards, the light shielding tape 28 must be peeled off and thereafter a new light shielding tape must be bonded again. This is very troublesome.

SUMMARY OF THE INVENTION

The present invention has been accomplished in order to solve such a problem. The present invention intends to provide a liquid crystal display device which can remove leakage of light from a sealant portion in a negative-type display to improve the appearance of an image. Where a large-scale display is composed of a large number of liquid crystal display devices, the present invention also intends to provide the liquid crystal display device which can surely make light-proof to the joints to constitute such a large-scale display with an excellent display characteristic.

A liquid crystal display device according to the present invention comprises a liquid crystal panel including two insulating base plates with electrode patterns provided on their surfaces, respectively, a sealant which bonds the two insulating base plates to each other at their peripheries with a prescribed gap therebetween so that the electrode patterns are opposite to each other, a liquid crystal layer provided in the prescribed gap between said two insulating base plates, and polarizing plates provided on the outer surfaces of said two insulating base plates, respectively; and a light-shielding mask which is fit in an exterior area from the sealant at an edge of said liquid crystal panel so that it sandwiches said insulating base plates of said liquid crystal panel from both sides.

In this configuration, regardless with the combination of polarizing plates, leakage of light is always eliminated at the portion of the sealant and its exterior, thereby preventing reduction of visibility due to the sealant. As a result, where a plurality of liquid crystal panels are arranged to constitute a large-scale display, it is possible to prevent leakage of light from the joints between the liquid crystal panels without bonding light shielding tapes to the joints.

The light-shielding mask has a U-shape in section formed by bending a metallic plate having a light-shielding property and resiliency and having an opening which has an interval slightly smaller than the thickness of the said liquid crystal panel. In this configuration, the light-shielding mask has only to be fit in order to realize light interruption. Since the light-shielding mask can be formed to have a very small thickness, the interval of each joint can be reduced, thereby realizing continuous display.

If the light-shielding mask is made from a heat-shrinkable tube of color preventing light from being interrupted, a half part cut in an axial direction from the heat-shrinkable tube having a slightly large diameter is covered on the liquid crystal panel and heated to be hardened. This simply realizes light interruption.

A first aspect of the present invention is a liquid crystal display device which comprises:

a liquid crystal panel including two insulating base plates with electrode patterns provided on their surfaces, respectively, a sealant which bonds the two insulating base plates to each other at their peripheries with a prescribed gap therebetween so that the electrode patterns are opposite to each other, and a liquid crystal layer provided in the prescribed gap between said two insulating base plates; and a light-shielding mask which is fit in an outer periphery of the sealant at an end of said liquid crystal panel so that it sandwiches said insulating base plates of said liquid crystal panel from both sides.

A second aspect of the device is a liquid crystal display device according to the first aspect, wherein the inner edge of said light-shielding mask is substantially aligned with that of the sealant for the liquid crystal panel.

A third aspect of the device is a liquid crystal display device according to the first aspect, wherein said liquid crystal panel further comprises polarized plates provided outside said first and second insulating base plates, respectively.

A fourth aspect of the device is liquid crystal display device according to the first aspect, wherein said light-shielding mask is formed so that said first and second base plates are fit from both sides.

A fifth aspect of the device is liquid crystal display device according to the first aspect, wherein said light-shielding mask has a U-shape in section formed by bending a metallic plate having a light-shielding property and resiliency and having an opening which has an interval slightly smaller than the thickness of the said liquid crystal panel.

A sixth aspect of the device is liquid crystal display device according to the first aspect, wherein said light-shielding mask is made from a heat-shrinkable tube of color preventing light from being interrupted.

A seventh aspect of the device is liquid crystal display device according to the first aspect, wherein said light-shielding mask is provided on each of both opposite sides of the outer periphery of said liquid crystal panel.

An eighth aspect of the device is liquid crystal display device according to the first aspect, wherein said light-shielding mask is provided on each of both opposite sides of the outer periphery of said liquid crystal panel, and on one side located between both opposite sides.

A ninth aspect of the device is liquid crystal display device according to the first aspect, wherein said light-shielding mask is provided to cover the entire outer periphery of said liquid crystal panel.

A tenth aspect of the device is liquid crystal display device according to the first aspect, wherein said light-shielding mask is provided with a light-shielding piece on at least one side thereof, said light-shielding piece extending outward from the outer edge thereof and serving to interrupt external light from the outer edge of said liquid crystal panel.

An eleventh aspect of the device is liquid crystal display device according to the first aspect, wherein said light-shielding mask is provided on the outer periphery of said liquid crystal panel and at a coupling portion of two adjacent liquid crystal panels so that said base plates are fit from its both sides.

A twelfth aspect of the device is liquid crystal display device according to the first aspect, wherein said light-shielding mask includes two light-shielding springs members each having an opening formed in a U-shape in section so as to provide a diameter slightly smaller than the thickness of said liquid crystal panel, said light-shielding spring members being coupled with each other so that their openings are located outside, and two liquid crystal panels are inserted into the corresponding two openings.

A thirteenth aspect of the method is a method of manufacturing a liquid crystal display device, which comprises the steps of:

preparing a liquid crystal panel including two insulating base plates with electrode patterns provided on their surfaces, respectively, a sealant which bonds the two insulating base plates to each other at their peripheries with a prescribed gap therebetween so that the electrode patterns are opposite to each other, and a liquid crystal layer provided in the prescribed gap between said two insulating base plates; and fixing a light-shielding mask which is fit in an outer periphery of the sealant at an end of said liquid crystal panel so that it sandwiches said insulating base plates of said liquid crystal panel from both sides.

A fourteenth aspect of the method is a method of manufacturing a liquid crystal display device according to the thirteenth aspect, wherein said step of fixing the light-shielding mask comprises the steps:

mounting a resilient light shielding tube so that it sandwiches the insulating base plates of said liquid crystal panel from both sides; and heating said light-shielding tube so that it is fit on an outer periphery of the sealant at an end of said liquid crystal panel by heat-shrinkage.

A fifteenth aspect of the method is a method of manufacturing a liquid crystal display device according to the thirteenth aspect, wherein said step of fixing the light-shielding mask comprises the step of:

mounting the insulating base plates of said liquid crystal panel into an opening of a light-shielding spring member formed in a U-shape in section so as to provide a diameter slightly smaller than the thickness of said liquid crystal panel so that the insulating base plates are sandwiched by the light-shielding spring member from both sides.

A sixteenth aspect of the method is a method of manufacturing a liquid crystal display device according to the thirteenth aspect, wherein said light-shielding mask is made of a heat-shrinkable tube of color preventing light from being interrupted.

A seventeenth aspect of the method is a method of manufacturing a liquid crystal display device according to the thirteenth aspect, wherein said light-shielding mask is provided on each of both opposite sides of the outer periphery of said liquid crystal panel.

An eighteenth aspect of the method is a method of manufacturing a liquid crystal display device according to the thirteenth aspect,, wherein said step of fixing the light-shielding mask comprises the step of:

mounting said light-shielding mask on the outer periphery of said liquid crystal panel and at a coupling portion of two adjacent liquid crystal panels so that said base plates are fit from its both sides, thereby coupling the two adjacent liquid crystal panels.

A nineteenth aspect of the method is a method of manufacturing a liquid crystal display device according to the fourteenth aspect, wherein said step of fixing the light-shielding mask comprises the step of:

preparing an integral light-shielding mask composed of two light-shielding springs members each having an opening formed in a U-shape in section so as to provide a diameter slightly smaller than the thickness of said liquid crystal, said light-shielding spring members being coupled with each other so that their openings are located outside;

inserting two liquid crystal panels into the corresponding two openings so that they are coupled with each other.

DESCRIPTION OF THE PREFERRED EMBODIMENTS

Embodiment 1

Figure 1:
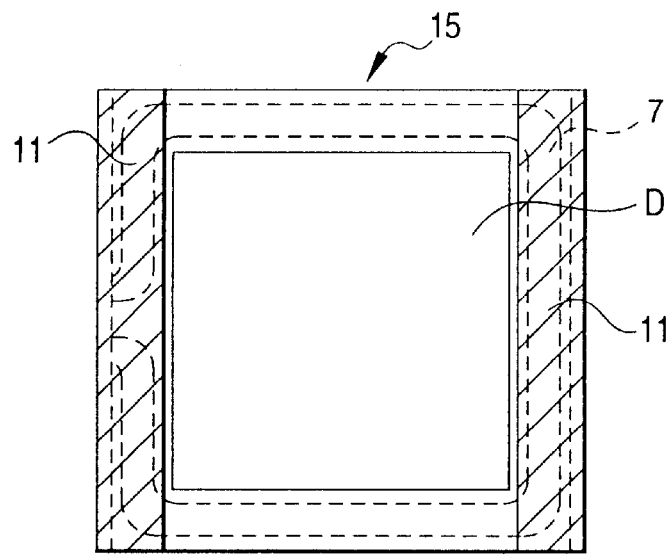
FIGS. 1(*a*) and 1(*b*) are views showing the plan and section of a first embodiment of a liquid crystal display device according to the present invention.
Figure 1:
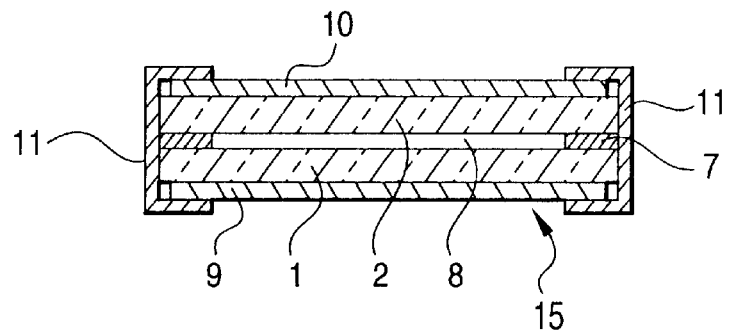

Now referring to the drawings, an explanation will be given of a liquid crystal display device according to the present invention.

Figure 3:
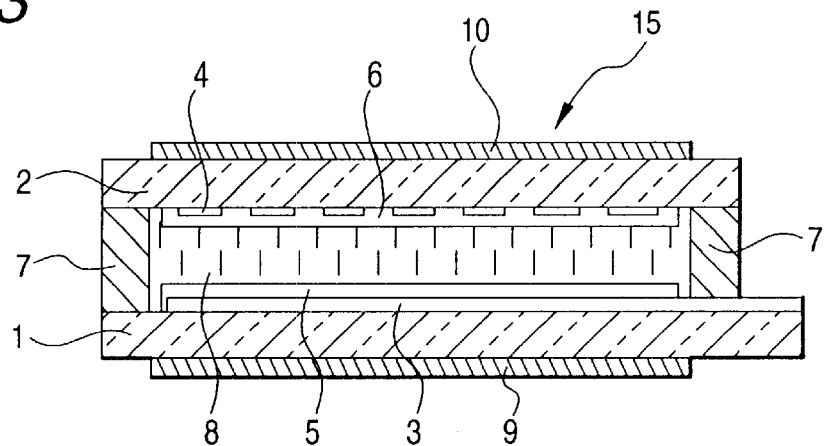
FIG. 3 is a view showing the section of a liquid crystal panel.

FIGS. 1(a) and 1(b) are a plan view and a sectional view of a liquid crystal display device according to an embodiment of the present invention. As seen from these figures, electrode patterns 3 and 4 are formed on inner surfaces of two insulating base plates 1 and 2. These insulating base plates 1 and 2 are spaced by a prescribed gap and bonded to each other by a sealant 7 on their periphery so that the electrode patterns 3 and 4 are opposite to each other (FIG. 3). A liquid crystal material is injected into the prescribed gap to provide a liquid crystal layer 8. Polarizing plates 9 and 10 are provided on the outer surfaces of the insulating plates 1 and 2. In the configuration described above, a liquid crystal panel 15 is constructed. The feature of the present invention resides in that a light-shielding mask 11 is provided at the edge of the liquid crystal panel from which no electrode pattern is introduced so that it sandwiches the insulating plates 1 and 2 from both sides of the liquid crystal panel.

The light-shielding mask 11 is preferably formed of a resilient thin metallic plate of phosphor bronze or stainless steel having a thickness of 0.1–0.15 mm. This is because these materials can be easily dealt with and can easily interrupt light although it is thin. In order to improve the light-shielding property, the surface of the mask is subjected to lusterless black treatment. Therefore, the mask 11, even if it is very thin, can have sufficient light-shield. The black treatment may be ferrite treatment, zinc plating, black coating, etc. Before being installed to the panel, the thin metallic plate serving as the light mask 11 is bent so that it has a U-shape section with a width of A which is a thickness of the liquid crystal panel (inclusive of the polarizing plates), and its tip is located inside by several degree (θ) from the right angle. The metallic plate is pushed into the ends of the liquid crystal panel 11 so that it can be easily mounted on the liquid crystal panel 15. Thus, it can be secured to the liquid crystal panel so that it does not easily fall out because of its resiliency. In FIG. 1, an area "D" indicates a display portion.

The liquid crystal panel 15 has the same configuration as that of a conventional liquid crystal device. As seen from FIG. 3 showing its cross section, electrode patterns 3 and 4 which are made of a transparent conductive film of ITO, indium oxide, tin oxide, etc. are provided on the surfaces of insulating base plates 1 and 2 of glass or plastic. These electrode patterns 3 and 4 are patterned using techniques of vacuum evaporation and photolithography. Using the techniques of offset printing of polyimide, orienting films 5 and 6, which determine the arranging direction of molecules of the liquid crystal material, are provided on the surfaces of the electrode patterns 3 and 4. The surfaces of the orienting films 5 and 6 are subjected to rubbing treatment so that the liquid crystal molecules can be easily oriented in a certain direction. These insulating base plates 1 and 2 are spaced by a prescribed gap through a spacer (not shown) and bonded to each other by a sealant 7 made of an epoxy resin on their periphery so that the electrode patterns 3 and 4 are opposite to each other (FIG. 3). A liquid crystal material is injected into the prescribed gap to provide a liquid crystal layer 8. Polarizing plates 9 and 10 are provided on the outer surfaces of the insulating plates 1 and 2. In the configuration described above, a liquid crystal panel 15 is constructed.

The polarizing plates 9 and 10 are provided on the outer surfaces of the insulating base plates 1 and 2 so that their polarizing axes (absorption axes) are in parallel because the polarizing directions are twisted by 90° by the liquid crystal layer 8 which may be made of TN (twist nematic) and configured in the negative type display. In this configuration, when a voltage is not applied to the liquid crystal layer, the linear polarized light having passed the one polarizing plate 9 is twisted by 90° by the liquid crystal layer 8 so that it is perpendicular to the polarizing axis of the other polarizing plate 10 and hence interrupted completely. Thus, the light does not pass to exhibit black. On the other hand, when the voltage is applied to the liquid crystal layer 8, the liquid crystal molecules stand up so that the light is not optically rotated by the liquid crystal layer 8. The light passes the other polarizing plate 10 as it is, and is recognized as transmitted light. Thus, by applying a driving waveform so that a voltage is applied to the electrode of the pixel whose display is desired, a desired display can be realized in white on a black background.

In accordance with the present invention, the light-shielding mask is only fit in the end of the liquid crystal panel so that the light leaking from the end of the liquid crystal panel, which is attributable to the absence of the liquid crystal layer in the area where the sealant is located, can be completely interrupted. Therefore, in the liquid crystal panel for the negative-type display and large-scale display in which a large number of liquid crystal panels are arranged, the leakage of light from the periphery of the liquid crystal panel or joints therebetween can be disregarded so that the liquid crystal display device with excellent display characteristic can be realized. Further, since the light-shielding mask can be installed on each liquid crystal panel, in the large-scale display in which a large number of liquid crystal panels are arranged, after the liquid crystal panels have been built into the display, it is not necessary to bond the light shielding tape on each of the joints therebetween. Thus, a large-scale display can be easily realized. Further, replacement of a faulty liquid crystal panel can be also easily performed.

The embodiment described above was directed to a monochromatic liquid crystal display device. However, the present invention can be more effectively applied to a color liquid display device which is generally in the negative-type display because light does not leak from the periphery of a color display panel. Thus, the color display device with excellent display characteristic can be realized.

In the embodiment described above, the liquid crystal display panel was provided with the polarized plates. However, the present invention can be applied to the liquid crystal display panel provided with color filter films instead of the polarized plates. For example, the present invention can be applied to a liquid crystal display panel in which first and second base plates having electrode patterns, respectively are bonded with a prescribed gap in their peripheries, a liquid crystal material doped with dichromatic dye is injected in the prescribed gap, a color filter film is provided at the area with no electrode pattern of the first base plate on the front side and another color filter film having the same color is provided at the area with at least the electrode pattern of the second base plate on the rear side.

Figure 4A:
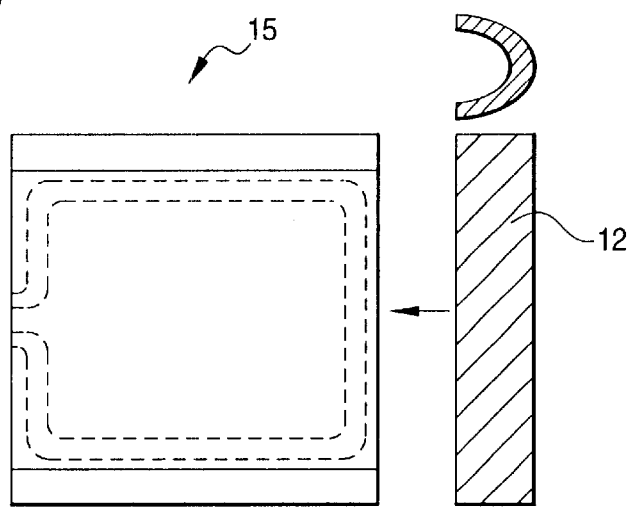
FIGS. 4(a) and 4(b) are views showing a second embodiment of the liquid crystal display device according to the present invention.
Figure 4B:
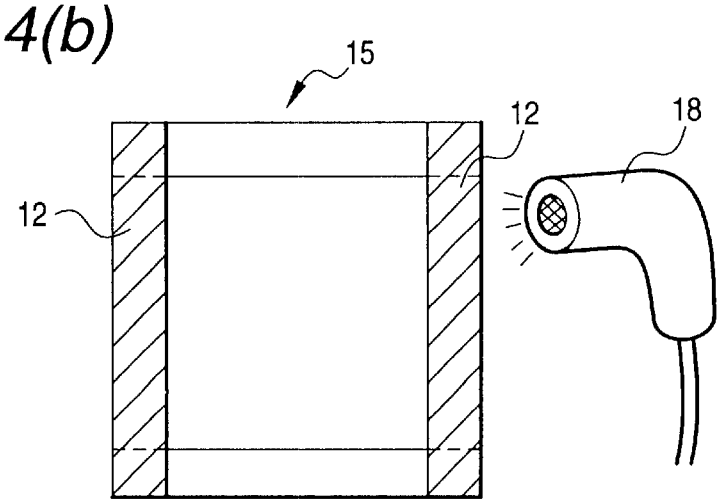

FIGS. 4A and 4B are views showing the steps in another embodiment according to the present invention. In this embodiment, a tube of heat-shrinkable resin is prepared as a material of the light-shielding mask 12. The heat-shrinkable tube having an internal diameter approximately equal to or slightly larger than the thickness of the liquid crystal panel 15 is cut into two half parts in an axial direction (the section is shown above the light mask 12). First, as shown in FIG. 4A, the part cut from the tube is covered on the end of the liquid crystal panel 15. Thereafter, as shown in FIG. 4B, hot wind is sprayed on the resin by a hot wind blower so that the resin is shrunk. Thus, the light-shielding mask 12 can be easily mounted on the end of the liquid crystal panel. Incidentally, in the example shown in FIG. 4, terminals of electrode patterns (not shown) are extended in upper and lower directions of the drawing. The upper glass plate has a smaller size than that of the lower glass plate so that a level difference is present therebetween.

Figure 5:
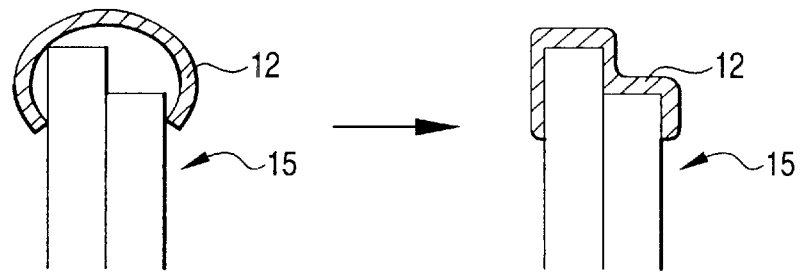
FIG. 5 is a view for explaining the covering of a step portion of the light-shielding mask shown in FIG. 4.

In this embodiment, the heat-shrinkable tube which has a slightly large diameter may be used. In this case, with the mask covered on the end of the liquid crystal panel with a certain margin, by only spraying hot wind on the mask, the mask can be brought into intimate contact with the end of the liquid crystal panel. Thus, the liquid crystal display device can be simply completed. In addition, even when a level difference or step exists between the glass base plates as shown in FIG. 5, the mask can be surely fixed on the step.

In the embodiment described above, a metallic plate or heat-shrinkable tube was used as a light-shielding mask. However, a fitting type mask of resin having the same shape as the metallic plate may be fit in the end of the liquid crystal panel. In this case, although such a mask cannot be made thin unlike the metallic plate, in an application which its thickness is not a serious problem, it can be implemented at lower cost than the metallic plate.

Where it is intended that a large number of liquid crystal panels are arranged, if the respective liquid crystal panels each equipped with a light-shielding mask according to the present invention are arranged and the light shielding tapes are bonded to the joints, the gaps between the liquid crystal panels can be stopped up. In this case, it has only to stop up only the narrow areas of the gaps of the liquid crystal panels. The display portion of the liquid crystal panel is not covered with the light shielding tape.

Figure 6:
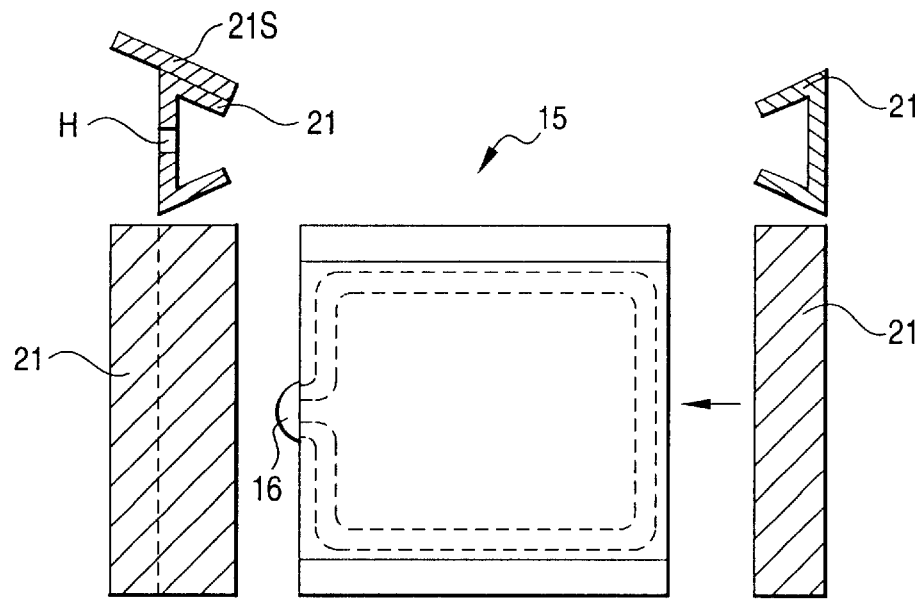
FIGS. 6(a) and 6(b) are views showing a third embodiment of the liquid crystal display device according to the present invention.
Figure 6:
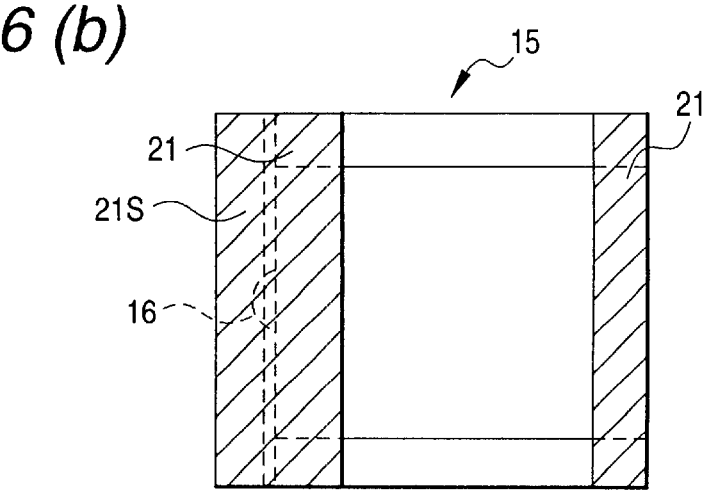
Figure 7:
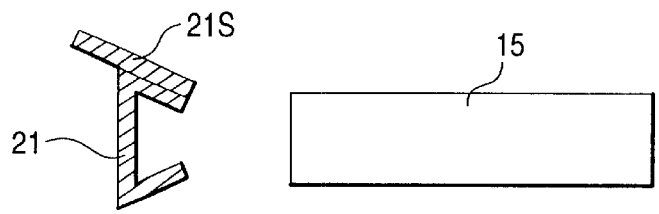
FIG. 7(a), 7(b) and 7(c) are views showing the third embodiment of the liquid crystal display device according to the present invention.
Figure 7:
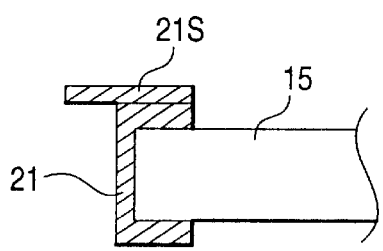
Figure 7:
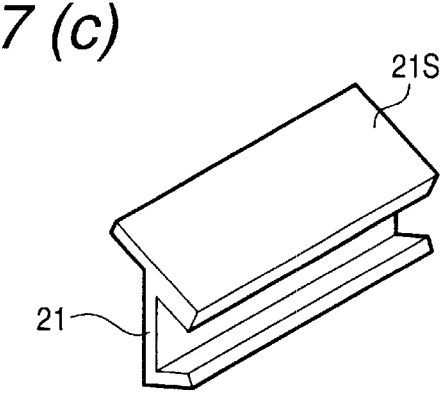
Figure 8:
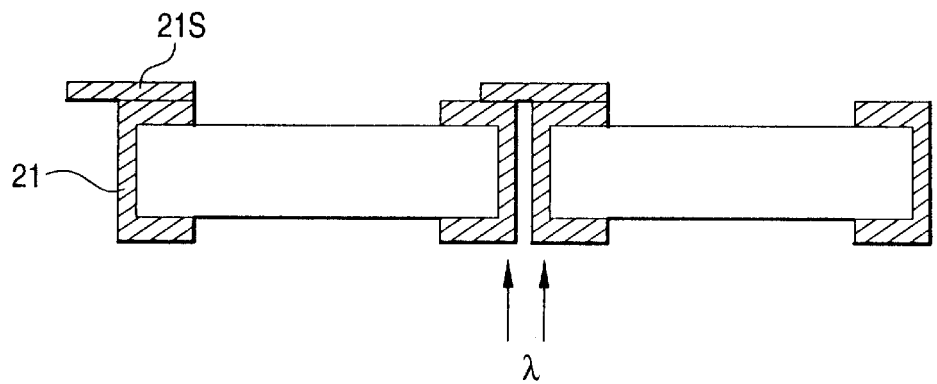
FIG. 8 is a view showing the third embodiment of the liquid crystal display device according to the present invention.

An explanation will be given of the third embodiment of the present invention. In this embodiment, a light-tight mask 21 is provided with a light-shielding piece 21s which extends outward from the outer edge thereof. This embodiment is particularly effective to the case where a plurality of liquid crystal panels are arranged in parallel. This prevents the leakage of light from the gap between the adjacent liquid crystal panels without bonding a light-tight tape. FIGS. 6A and 6B are views showing the process for implementing this embodiment. In this embodiment, the light-shielding mask 21 equipped with the light-shielding piece 21s is used. The body of the light-shielding mask has a U-shape in section as in the first embodiment. In the process of making the liquid crystal display device, as seen from FIG. 6A, the light-shielding mask 21 (the section thereof is shown on the upper side), which is formed in the same manner as the light-shielding mask according to the first embodiment shown in FIG. 1, is covered on the end of the liquid crystal panel 15. Subsequently, as seen from FIG. 6B, it is easily mounted on the end of the liquid crystal panel 15 (see FIGS. 7A, 7B and 7c). Additionally, as seen from FIG. 6A, a liquid crystal sealing inlet 16 is protruded from the liquid crystal panel. The light-shielding mask 21 has a hole H corresponding to the sealing inlet 16. Thus, a gap which leads to leakage of light λ is formed between the adjacent liquid crystal panels. However, the light-shielding piece 21s according to this embodiment covers the gap so that light does not leak from the gap.

An explanation will be given of the fourth embodiment of the present invention. This embodiment intends to connect two liquid crystal panels using two light-shielding masks which are successively fixed to each other.

Figure 2:
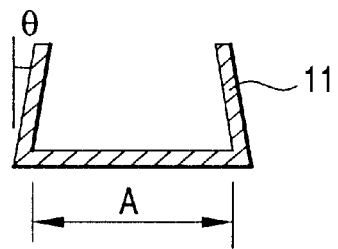
FIG. 2 is a view showing the section of a light-shielding mask shown in FIG. 1.
Figure 9:
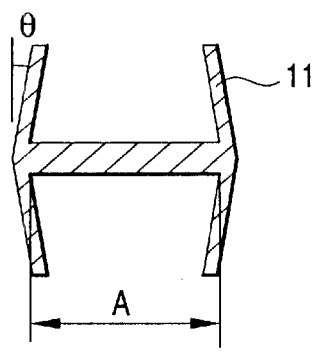
FIG. 9 is a view showing a fourth embodiment of the liquid crystal display device according to the present invention.

FIG. 9 shows an integral light-mask 11 used in this embodiment. The integral light-shielding mask 11 is composed of a first light-shielding mask component and a second light-shielding mask component. The shape and material of these light-shielding mask components may be the same as those of the light-shielding mask according to the first embodiment shown in FIGS. 1 and 2.

Figure 10:
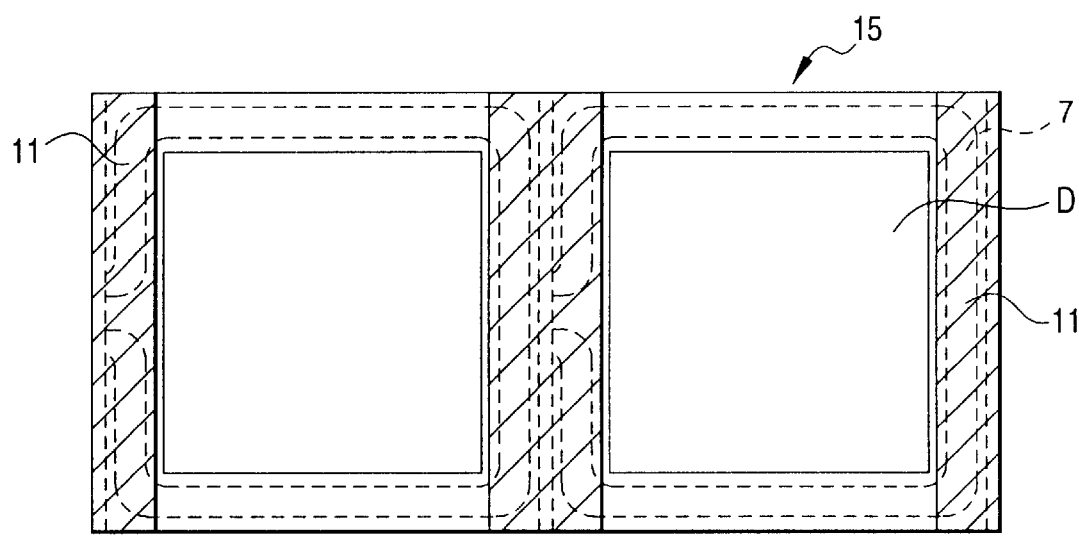
FIGS. 10(a) and 10(b) are views showing the fourth embodiment of the liquid crystal display device according to the present invention.
Figure 10:
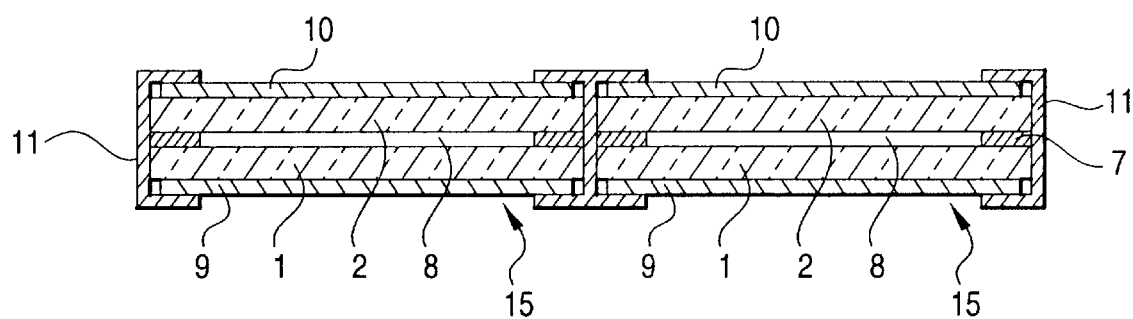
Figure 11:
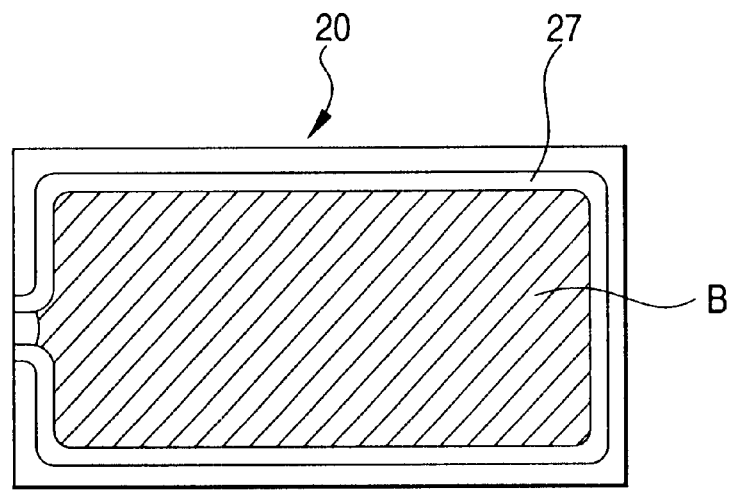
FIG. 11 is a view showing the manner of light leakage on the periphery of a conventional liquid display device in negative-type display.
Figure 12:
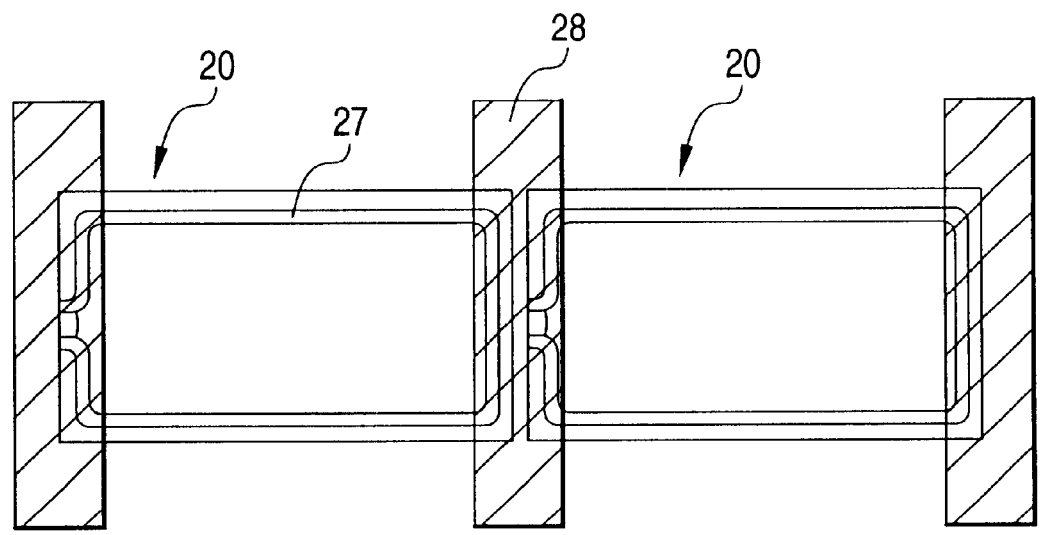
FIG. 12 is a view showing the manner of bonding light shielding tapes at the joints between liquid crystal panels which are successively arranged.

FIGS. 10A and 10B are a top view and sectional view of a liquid crystal panel array in which two liquid crystal panels 15 are coupled with each other using the light-shielding mask 11.

In this configuration, the adjacent liquid crystal panels can be easily aligned to each other, and coupled with each other with no redundant gap. This configuration is also efficient to eliminate the leakage of light through the gap.

As described above, in accordance with the present invention, the leakage of light at the end of the liquid crystal panel can be prevented by a simple structure, thus providing a liquid crystal display device with an excellent display characteristic. Further, where a large number of liquid crystal panels are arranged to constitute a large-scale display, the leakage of light from the joints can be prevented, thereby providing a large-scale display with an excellent display characteristic.

What is claimed is:

1. A liquid crystal display device comprising:
   a liquid crystal panel including two insulating base plates with electrode patterns provided on their surfaces, respectively, a sealant which bonds the two insulating base plates to each other at their peripheries with a prescribed gap therebetween so that the electrode patterns are opposite to each other, and a liquid crystal player provided in the prescribed gap between said two insulating base plates; and a resilient light-shielding mask which is fit in an outer periphery of the sealant at an end of said liquid crystal panel so that the resilient light-shielding mask sandwiches said insulating base plates of said liquid crystal panel from both sides, wherein said resilient light-shielding mask has an opening which has an interval defined between extending portions of said resilient light-shielding mask that is slightly smaller than the thickness of said liquid crystal panel.

2. A liquid crystal display device according to claim 1, wherein the inner edge of said resilient light-shielding mask is substantially aligned with that of the sealant for the liquid crystal panel.

3. A liquid crystal display device according to claim 1, wherein said liquid crystal panel further comprises polarized plates provided outside said first and second insulating base plates, respectively.

4. A liquid crystal display device according to claim 1, wherein said resilient light-shielding mask is adapted so that said first and second base plates are fit from both sides.

5. A liquid crystal display device according to claim 1, wherein said resilient light-shielding mask has a U-shape in section formed by bending a metallic plate having a light-shielding property.

6. A liquid crystal display device according to claim 1, wherein said resilient light-shielding mask is provided on each of both opposite sides of the outer periphery of said liquid crystal panel.

7. A liquid crystal display device according to claim 1, wherein said resilient light-shielding mask is provided on each of both opposite sides of the outer periphery of said liquid crystal display panel, and on one side located between both opposite sides.

8. A liquid crystal display device according to claim 1, wherein said resilient light-shielding mask is provided to cover the entire outer periphery of said liquid crystal panel.

9. A liquid crystal display device according to claim 1, wherein said resilient light-shielding mask is provided with a light-shielding piece on at least one side thereof, said light-shielding piece extending outward from the outer edge thereof and serving to interrupt external light from the outer edge of said liquid crystal panel.

10. A liquid crystal display device according to claim 1, wherein said resilient light-shielding mask is provided on the outer periphery of said liquid crystal panel and at a coupling portion of two adjacent liquid crystal panels so that said base plates are fit from its both sides.

11. A liquid crystal display device according to claim 1 wherein said resilient light-shielding mask includes two light-shielding spring members each having an opening formed in a U-shape in section so as to provide an interval that is slightly smaller than the thickness of said liquid crystal panel, said light-shielding spring members being coupled with each other so that their openings are located outside, and two liquid crystal panels are inserted into the corresponding two openings.

12. A method for manufacturing a liquid crystal display device comprising the steps of:

preparing a liquid crystal panel including two insulating base plates with electrode patterns provided on their surfaces, respectively, a sealant which bonds the two insulating base plates to each other at their peripheries with a prescribed gap therebetween so that the electrode, patterns are opposite to each other, and a liquid crystal player provided in the prescribed gap between said two insulating base plates; and fixing a resilient light-shielding mask which is fit in an outer periphery of the sealant at an end of said liquid crystal panel so that the resilient light-shielding mask sandwiches said insulating base plates of said liquid crystal panel from both sides, wherein said resilient light-shielding mask has an opening which has an interval defined between extending portions of said resilient light-shielding mask that is slightly smaller than the thickness of said liquid crystal panel.

13. A method of manufacturing a liquid crystal display device according to claim 12, wherein said step of fixing the resilient light-shielding mask comprises the stop of:

mounting the insulating base plates of said liquid crystal panel into an opening of a light-shielding spring member formed in a U-shape in section so as to provide an interval that is slightly smaller than the thickness of said liquid crystal panel so that the insulating base plates are sandwiched by the light-shielding spring member from both sides.

14. A method of manufacturing a liquid crystal display device according to claim 12, wherein said resilient light-shielding mask is provided on each of both opposite sides of the outer periphery of said liquid crystal panel.

15. A method of manufacturing a liquid crystal display device according to claim 12, wherein said step of fixing the resilient light-shielding mask comprises the step of:

mounting said resilient light-shielding mask on the outer periphery of said liquid crystal panel and at a coupling portion of two adjacent liquid crystal panels so that said base plates are fit from its both sides, thereby coupling the two adjacent liquid crystal panels.

16. A method of manufacturing a liquid crystal display device according to claim 12, wherein said step of fixing the resilient light-shielding mask comprises the steps of:

preparing an integral light-shielding mask composed of two light-shielding spring members each having an opening formed in a U-shape in section so as to provide an interval that is slightly smaller than the thickness of said liquid crystal panel, said light shielding spring members being coupled with each other so that their openings are located outside; and inserting two liquid crystal panels into the corresponding two openings so that they are coupled with each other.

* * * * *